(12) United States Patent
Hadley et al.

(10) Patent No.: US 9,321,504 B2
(45) Date of Patent: Apr. 26, 2016

(54) BRAKING DEVICE FOR A PERSONAL MOBILITY VEHICLE

(71) Applicant: RAZOR USA LLC, Cerritos, CA (US)

(72) Inventors: Robert Hadley, Yorba Linda, CA (US); Robert Chen, San Marino, CA (US)

(73) Assignee: RAZOR USA LLC, Cerritos, CA (US)

( * ) Notice: Subject to any disclaimer, the term of this patent is extended or adjusted under 35 U.S.C. 154(b) by 0 days.

(21) Appl. No.: 14/466,836

(22) Filed: Aug. 22, 2014

(65) Prior Publication Data

US 2015/0041235 A1 Feb. 12, 2015

Related U.S. Application Data

(63) Continuation of application No. 13/745,664, filed on Jan. 18, 2013, now Pat. No. 8,813,892.

(60) Provisional application No. 61/589,177, filed on Jan. 20, 2012.

(51) Int. Cl.
| | |
|---|---|
| *B62M 7/00* | (2010.01) |
| *B62L 1/04* | (2006.01) |
| *B62K 11/00* | (2006.01) |
| *B62K 3/00* | (2006.01) |
| *B62K 23/08* | (2006.01) |
| *F16D 49/00* | (2006.01) |
| *B62L 1/00* | (2006.01) |
| *B62L 3/04* | (2006.01) |
| *F16D 121/14* | (2012.01) |

(52) U.S. Cl.
CPC . *B62L 1/04* (2013.01); *B62K 3/002* (2013.01); *B62K 11/00* (2013.01); *B62K 23/08* (2013.01); *B62L 1/00* (2013.01); *B62L 3/04* (2013.01); *F16D 49/00* (2013.01); *B62K 2202/00* (2013.01); *B62K 2204/00* (2013.01); *F16D 2121/14* (2013.01)

(58) Field of Classification Search
CPC .......... B62K 2202/00; B62K 2204/00; B62K 11/00; B62L 1/00; B62L 1/04
USPC ........................................................ 180/181
See application file for complete search history.

(56) References Cited

U.S. PATENT DOCUMENTS

| | | | |
|---|---|---|---|
| 4,094,372 | A | 6/1978 | Notter |
| 5,662,187 | A | 9/1997 | McGovern |
| 6,139,035 | A | 10/2000 | Tsai |
| 6,273,205 | B1 | 8/2001 | Tsai |
| 6,296,082 | B1 | 10/2001 | Tsai |
| 6,298,952 | B1 | 10/2001 | Tsai |
| 6,386,330 | B1 | 5/2002 | Wei |

(Continued)

FOREIGN PATENT DOCUMENTS

CH 598051 4/1978

*Primary Examiner* — Tony Winner
(74) *Attorney, Agent, or Firm* — Knobbe Martens Olson and Bear LLP

(57) ABSTRACT

A personal mobility vehicle, such as a scooter, includes at least one battery and motor for powering at least one driven wheel. The vehicle also includes a braking assembly configured to isolate the motor from the at least one driven wheel such that power is terminated from the motor to the at least one wheel in response to a user engaging a braking assembly of the vehicle. The vehicle can include a switch or position sensor that interacts with the braking assembly to initiate the isolation of the motor from the at least one driven wheel and the switch or position sensor preferably is inaccessible to the foot of the user.

18 Claims, 8 Drawing Sheets

(56) References Cited

U.S. PATENT DOCUMENTS

| | | |
|---|---|---|
| 6,394,213 B1 | 5/2002 | Tsai |
| 6,462,493 B2 | 10/2002 | Lan |
| 6,619,416 B2 | 9/2003 | Lan |
| 6,739,421 B1 | 5/2004 | Miya |
| 6,832,660 B2 | 12/2004 | Dodd |
| 2003/0221888 A1 | 12/2003 | McKinney, Jr. et al. |

BRAKING DEVICE FOR A PERSONAL MOBILITY VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND OF THE DISCLOSURE

1. Field of the Invention

Embodiments of the invention relate generally to personal mobility vehicles and, more specifically, to an electric scooter with a foot brake assembly.

2. Description of the Related Art

The use of personal mobility vehicles, such as scooters, has become a popular recreational activity as well as useful means of personal transportation. Scooters have become popular among many age groups and there are many different scooter variations and scooter designs. Conventional scooters have at least two wheels and a steering mechanism. Scooter designs have become more compact and convenient, and some scooters have folding mechanisms allowing the user to easily store or carry the scooter. In order to allow a user to slow or stop a scooter, some scooters include a braking mechanism. With the increased popularity of scooters, variations of the conventional scooters have gained popularity as well, including motorized scooters.

With the use of electric or motorized scooters, the use of conventional braking methods is undesirable. The known brake mechanisms may not offer enough frictional resistance to stop a scooter wheel being driven by an electric motor as desired by scooter users. Additionally, if the scooter wheel used for applying the braking forces is the same wheel which is driven directly by the motor, using a conventional brake may cause serious damage to the motor or drive components. Using other more complicated and larger braking mechanisms for electric scooters would add additional cost and complexity to the scooters, which are popular in due part to their relative low price and simplistic convenience. Thus there is a need to provide an apparatus to allow for effective and convenient braking for electric scooters at a low cost.

SUMMARY OF THE DISCLOSURE

Some personal mobility vehicle embodiments utilize a foot brake mechanism to allow the user to slow the speed of the scooter or to bring the scooter to a complete stop. The foot brake mechanism commonly includes a fender positioned above the at least one rear wheel such that the user may depress the fender to bring the underside of the fender in contact with the rear wheel, slowing the rotation of the wheel to slow the speed of the scooter.

Some electric powered scooter embodiments include an electric motor mounted to the front or rear of the scooter frame near at least one of the front or rear wheels, with a drive assembly or drive means coupled to the motor configured to transfer drive power from the motor to the driven front or rear wheel. Drive means commonly include powered rollers using frictional directional force upon the circumference of the driven wheel or a drive chain linking the drive means to the hub of the driven wheel. The driven wheel can be electrically driven when a throttle assembly controlling the motor, commonly located on or about the handlebar, is activated by the user.

With the use of electric scooters, a conventional foot brake may be undesirable. A conventional brake may not offer enough frictional resistance to stop a scooter wheel being driven by an electric motor within performance parameters comparable to, or expected by, users of conventional scooters. Additionally, if the scooter wheel used for applying the braking forces is the same wheel which is driven directly by the motor, using a conventional foot brake may cause serious damage to the motor or drive components. Using other braking mechanisms for electric scooters such as disc brakes or caliper brakes could add additional cost and complexity to the scooters, which are popular in due part to their relative low price and simplistic convenience.

Preferred embodiments of the electric scooter with foot brake assembly are configured to allow a user to apply a fender foot brake to at least one wheel of an electric motorized scooter which simultaneously cuts off power from the motor to the driven wheel. A user is able to use the foot fender brake to slow the speed of the scooter or bring the scooter to a complete stop without risking damage to the motor or drive mechanism if the user is simultaneously engaging the throttle control for the motor.

A preferred embodiment is an electric motorized scooter having a frame body comprising a user support member and a steering mechanism, at least one driven wheel, at least one braking wheel, and a foot brake assembly configured to apply braking forces to the at least one wheel of the scooter. The electric scooter additionally comprises at least a controller and at least one battery and at least one electric motor with drive means coupled to the motor configured to transfer drive power from the motor to the at least one driven wheel. The foot brake assembly comprises a fender portion supported by the scooter body. In another preferred embodiment, the fender portion and connector portion are configured to be supported by the user support member. In a preferred embodiment, the fender portion comprises a frictional braking surface configured to apply frictional braking force upon the outer circumference of a wheel of the scooter. The fender portion is positioned about the at least one braking wheel of the scooter and has a first position in which the fender portion is not in frictional contact with the at least one braking wheel, and a second engaged position in which the fender portion is in frictional contact with the outer circumference of the at least one braking wheel.

A preferred embodiment further comprises the foot brake assembly operably connected to an electrical switch, position sensor or relay which is disengaged when the fender portion is moved to the second engaged position, causing the switch or relay to send an electrical signal to the controller to isolate the electric motor from the driven wheel to terminate power transfer from the motor to the driven wheel. Alternatively, moving the fender portion to the second engaged position causes a disruption in the electrical circuit comprising the controller, battery, motor, and driven wheel such that power transfer from the motor to the driven wheel is terminated.

In a preferred embodiment, the driven wheel is a wheel supported near the rear portion of the user support platform. In another preferred embodiment, the driven wheel is a wheel mounted near the front portion of the user support platform. In a preferred embodiment, the driven wheel is the same wheel as the braking wheel. In another preferred embodiment, the driven wheel and the braking wheel are distinct.

In a preferred embodiment in which an engagement portion of the fender foot brake assembly is operably connected to an electrical switch or relay, the electrical switch or relay and the engagement portion of the foot brake are positioned on the underside of the fender. In a preferred embodiment, the switch or relay and the engagement portion of the foot brake are positioned at the rotational connection point between the fender portion and the scooter body. In one embodiment, the switch or relay and the engagement portion of the foot brake is positioned away from the braking wheel. In yet another preferred embodiment, the switch or relay and the engagement portion of the foot brake is positioned such that these components are protected from external debris, moisture, or harmful contact with external elements and inaccessible by inadvertent and accidental contact by the foot of the user.

BRIEF DESCRIPTION OF THE DRAWINGS

These and other features, aspects, and advantages of the present invention are described below with reference to drawings of a preferred embodiment, which are intended to illustrate, but not to limit, the present invention.

DETAILED DESCRIPTION OF THE PREFERRED EMBODIMENTS

Reference will now be made in detail to various embodiments of the present technology. While numerous specific embodiments of the present technology will be described in conjunction with the alternative embodiments, it will be understood that they are not intended to limit the present technology to these embodiments. On the contrary, these described embodiments of the present technology are intended to cover alternatives, modifications and equivalents. Furthermore, in the following detailed description, numerous specific details are set forth in order to provide a thorough understanding of the present technology. However, it will be recognized by one of ordinary skill in the art that embodiments may be practiced without these specific details. In other instances, well known methods, procedures, compounds, compositions and mechanisms have not been described in detail as not to unnecessarily obscure aspects of embodiments of the present technology.

Figure 1:
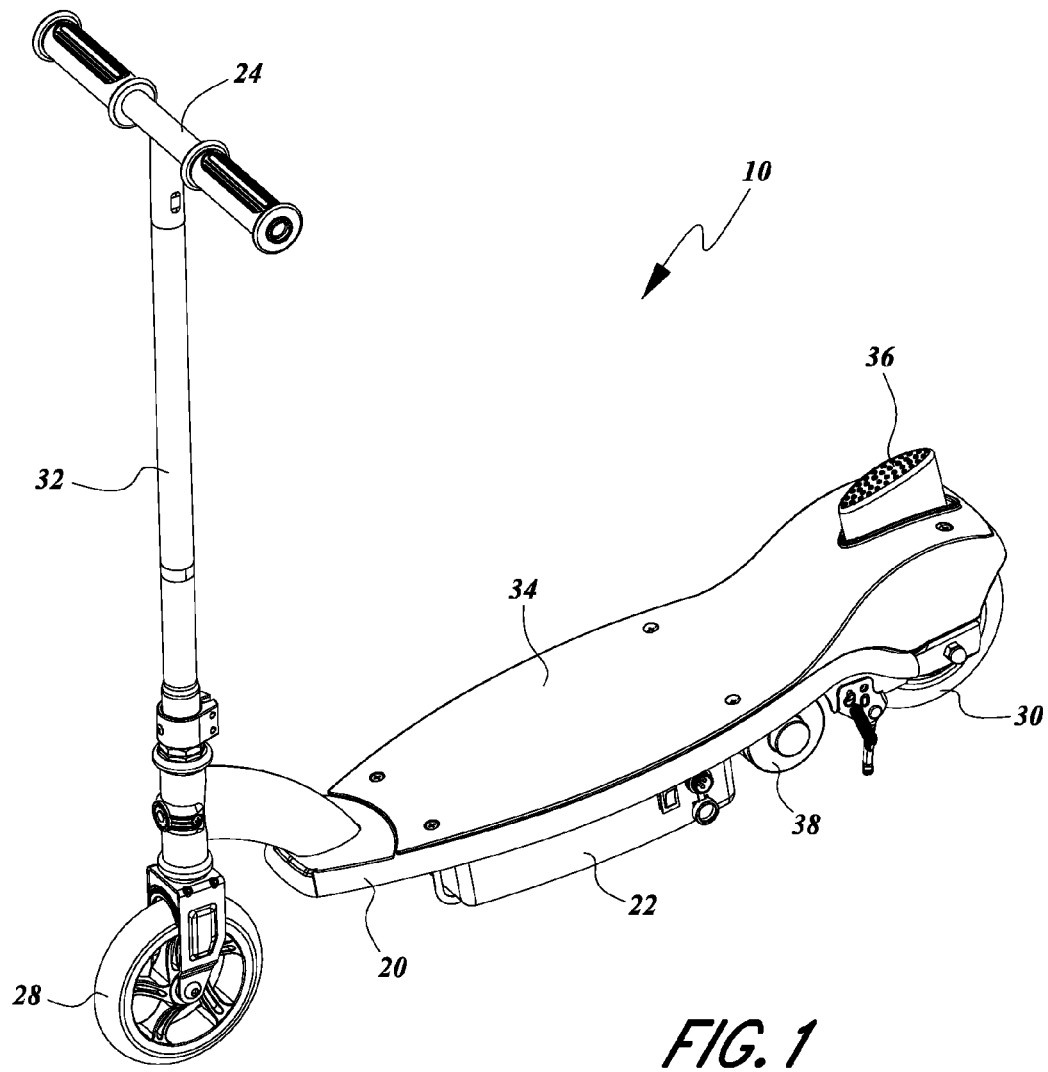
FIG. 1 is a perspective view of an embodiment of a scooter having certain features, aspects, and advantages of the present invention.

Referring now to FIG. 1, a preferred embodiment of the electric scooter is depicted having certain features, aspects and advantages of the present invention. The depicted embodiment includes a scooter body 20, a support assembly 34, and handlebar assembly 24. Preferably, the support assembly 34 is configured to support at least one foot of the user. The illustrated support assembly 34 is configured to accommodate both feet of a user, preferably in one or both of a fore-and-aft or side-by-side arrangement. The scooter includes at least one front wheel 28 and at least one rear wheel 30 supported by the scooter body. The depicted scooter 10 includes a front wheel 28 and a rear wheel 30 spaced apart from one another with the support assembly 34 extending therebetween. Preferably, the wheels 28, 30 are aligned in the same plane, as depicted, and located at opposite ends of the support assembly 34. As depicted, a preferred embodiment of the scooter 10 also includes a steerer shaft 32 which rotates with the handlebar assembly 24 so that the handlebar assembly 24 can rotate or swivel within the head tube of the scooter body 20. The support assembly 34 comprises a void through which a foot actuator portion 36 is accessible to the foot of the user, and said foot actuator portion is operably connected to the fender brake mechanism. In other embodiments, the foot actuator portion 36 could be located at different locations on the scooter, including near the center of the support assembly or near the front of the support assembly.

A preferred embodiment of the electric scooter further comprises a battery housing 22 comprising a controller and at least one battery, which can be mounted to the underside of the scooter body 20 underneath the support assembly 34. The preferred embodiment further comprises an electric motor 38, which also can be mounted to the underside of the scooter body 20 underneath the support assembly 34 and operably coupled to the at least one rear wheel to provide electric powered rotational force upon the at least one rear wheel. In other embodiments, the battery housing 22 and the electric motor 38 can be located or supported at different locations on the scooter, including on top of the support assembly or adjacent either the front or rear wheel.

Figure 2:
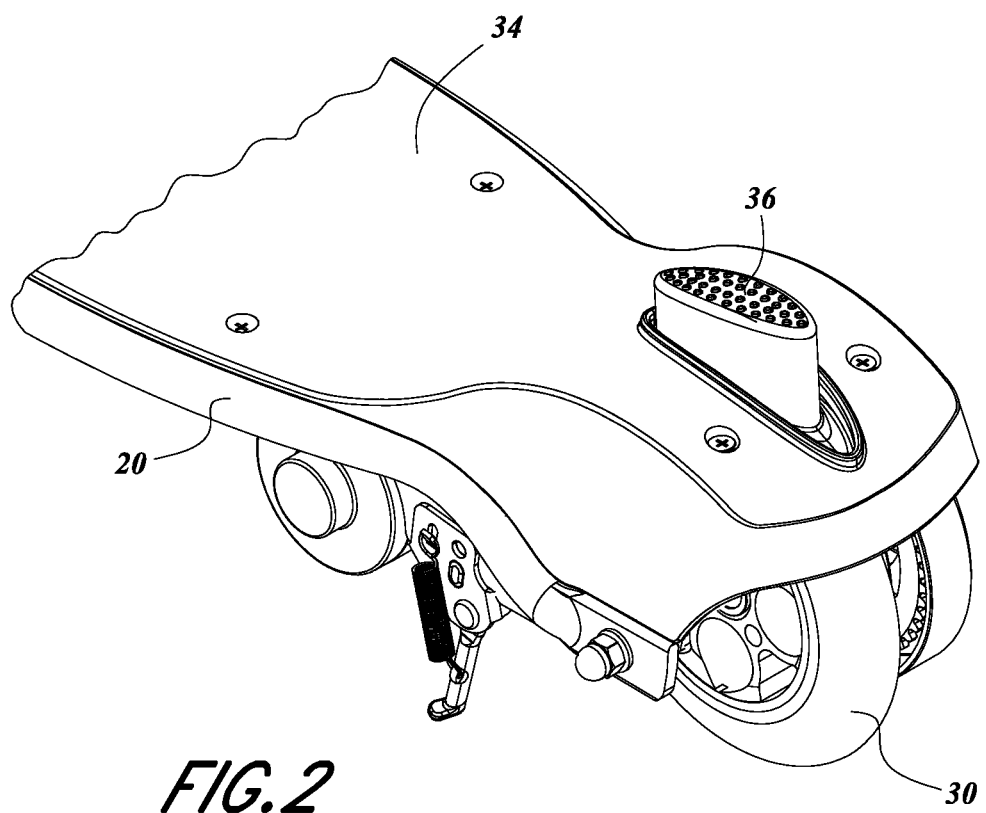
FIG. 2 is a perspective view of the rear portion of the scooter of FIG. 1 having a foot actuated brake.

FIG. 2 depicts a preferred embodiment of the electric scooter 10, specifically the rear portion of the electric scooter comprising the scooter body 20, the support assembly 34, and the at least one rear wheel 30. The preferred embodiment further comprises the foot actuator portion 36. FIG. 2 further depicts the support assembly 34 having a void through which the foot actuator portion 36 is accessible to the foot of the user.

The shape and size of said void may be substantially similar to the horizontal cross-sectional shape and size of the foot actuator portion 36 to eliminate or minimize any lateral gaps between the inner surface of said void of the support assembly 34 and the opposing vertical outer surface of the foot actuator portion 36 to prevent debris or other contamination from falling through the gap and damaging the components positioned below the foot actuator portion 36. In the illustrated arrangement, the void is defined by a surface of the support assembly 34 that defines a closed loop. That is, the support assembly 34 entirely surrounds the foot actuator portion 36. However, in other arrangements, the support assembly 34 may only partially surround the foot actuator portion 36. In other embodiments, the foot actuator portion 36 could extend behind the support assembly 34, extend from under the side of the support assembly 34 or be supported by a different part of the scooter. As illustrated, the foot actuator portion 36 extends through the support assembly 34 at a location above the rear wheel 30. However, in other embodiments the actuator portion 36 could extend through the support assembly 34 at a different location adjacent to the rear wheel or further from the rear wheel 30. In the illustrated arrangement, the foot actuator portion 36 (and/or the void) is generally oval in shape from a top view with the major axis of the oval extending in a lengthwise direction; however, other suitable shapes and/or orientations of the foot actuator portion 36 (and/or the void) can be used.

The foot brake assembly comprises a foot actuator portion which is operably coupled to a frictional braking surface such that depressing the foot actuator portion 36 causes the foot actuator portion 36 and the frictional braking surface to move from a first position in which the frictional braking surface does not contact the at least one braking wheel, to a second position in which the frictional braking surface engages and applies frictional contact to the braking wheel. In the depicted embodiment, the braking wheel and the rear wheel are the same, but in other embodiments they can be distinct. The preferred embodiment further comprises a support assembly 34 having a first height, a void through said support assembly 34, and a foot actuator portion 36 having a second height available to the foot of the user through said void, where said second height is substantially greater than said first height such that the second height remains substantially greater than the first height after moving the foot actuator portion 36 to the second position by depressing the foot actuator portion 36 downward. Thus the top surface of the actuator portion 36 does not move below the top surface of the surrounding support assembly 34. This configuration allows the user to continually apply downward pressure on the foot actuator portion 36 to increase braking force on the braking wheel without the foot actuator portion 36 becoming unavailable to the foot of the user due to the second height being lowered below the first height of the support assembly 34. This is especially advantageous over time as the diameter of the braking wheel decreases due to prolonged wear on the outer circumference of the wheel from frictional braking forces, thereby increasing the distance traveled by the foot actuator portion 36 from the first position to the second position.

Figure 3:
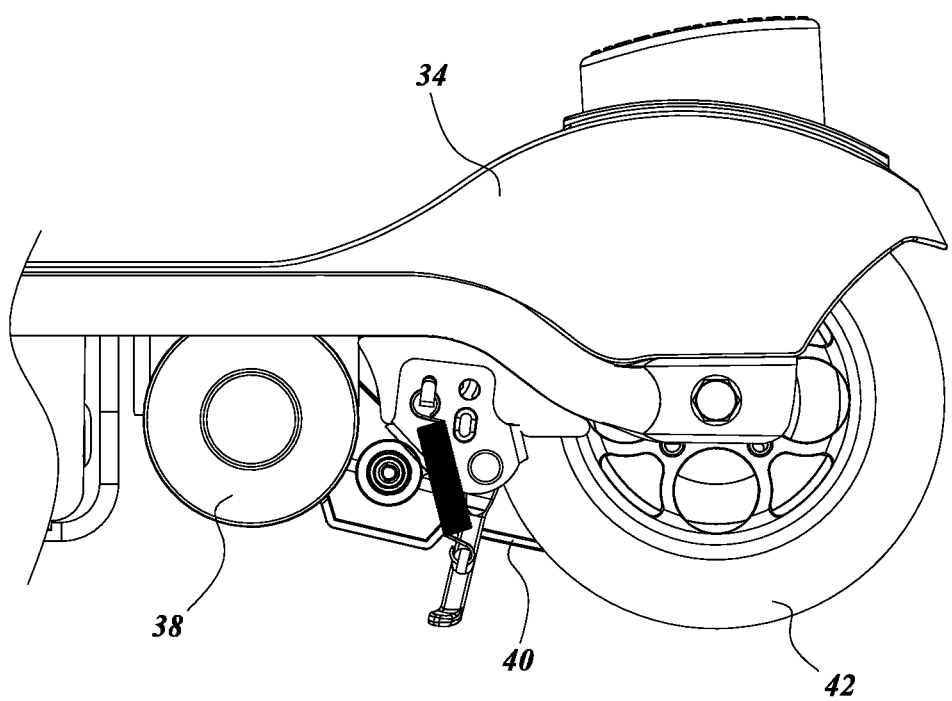
FIG. 3 is a side view of the rear portion of the scooter of FIG. 1.

FIG. 3 is a side view of a preferred embodiment of the electric scooter 10, depicting some of the elements positioned underneath the support assembly 34 including the at least one driven wheel 42 and the electric motor 38. The preferred embodiment further comprises a drive chain 40 or endless loop operably coupled to a drive shaft connected to the electric motor 38, said drive chain also operably coupled to a sprocket connected to the axle of the at least one driven wheel 42 such that rotational force is transferred from the electric motor 38 to the at least one driven wheel 42. In a preferred embodiment, the drive chain 40 is operably coupled to a sprocket connected to the axle of the driven wheel, and the sprocket includes a one-way clutch mechanism. In another embodiment, the drive chain 40 is a belt as used in a belt-drive system. In another preferred embodiment, a draft shaft connected to the electric motor 38 is operably coupled to a powered roller which applies frictional rotational force upon the outer circumference of the driven wheel 42. In another preferred embodiment, the powered roller applies frictional rotational force upon a hub connected to the axle of the driven wheel 42. In one preferred embodiment, the driven wheel 42 comprises the rear wheel 30. In another preferred embodiment, the driven wheel 42 is positioned toward the front of the scooter 10. In another preferred embodiment, the driven wheel 42 is the same wheel as the braking wheel 44.

Figure 4:
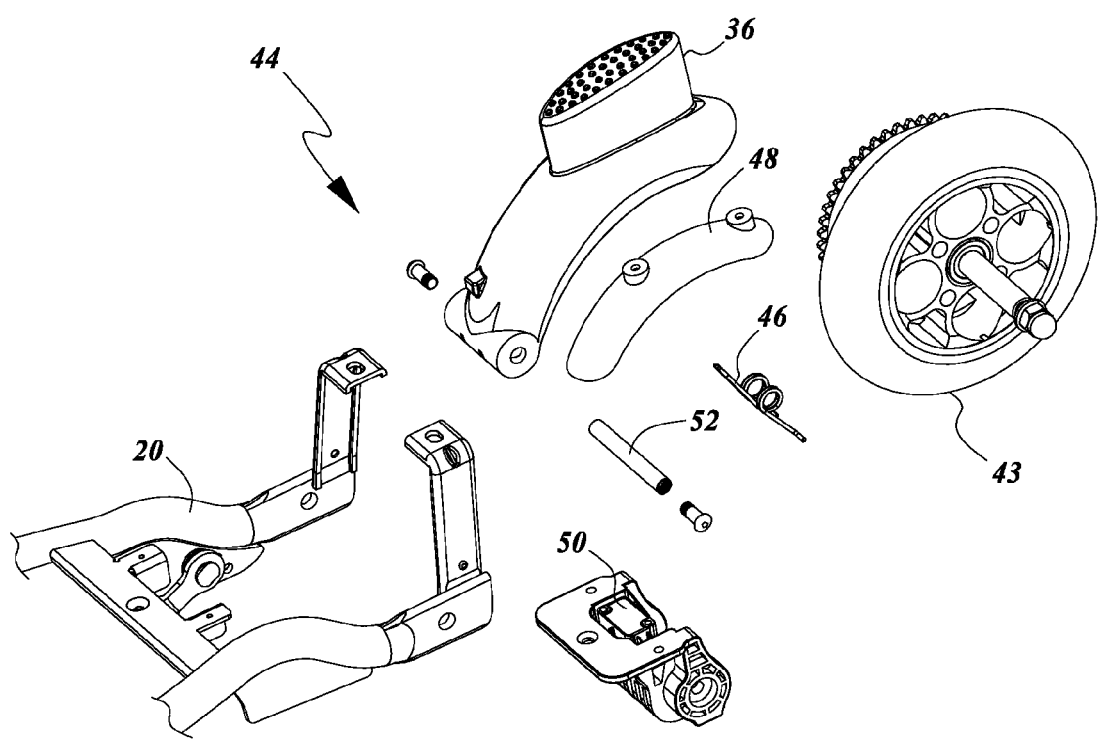
FIG. 4 is an exploded view of the rear portion of the scooter of FIG. 1.

FIG. 4 is an exploded view of elements of the foot brake assembly 44 of a preferred embodiment of the scooter 10. An embodiment of the foot brake assembly comprises a foot actuator portion 36, a frictional braking surface 48, a brake power switch 50, a fender biasing member 46, and a fender axle 52 about which the foot brake assembly rotates in relation to the scooter body 20. In a preferred embodiment, the foot brake assembly is rotatably coupled to the scooter body 20 at a position adjacent the rear wheel 30 and the actuator portion 36 is rotatably supported by the scooter body 20. In another preferred embodiment, the foot brake assembly is rotatably coupled to the scooter body 20 at a position near the front wheel. In a preferred embodiment, the frictional braking surface 48 is a separate component that is connected to or supported by the underside of the foot actuator portion 36 and configured such that the underside of the frictional braking surface 48 is placed in frictional contact with the outer circumference of the braking wheel 43 when the user lowers the foot brake assembly 44 by exerting downward pressure on the foot actuator portion 36 with a foot. Thus, the frictional braking surface 48 can be replaced, if necessary or desired. Alternatively, the frictional braking surface 48 and the actuator portion 36 can be one unitary piece. The frictional braking surface 48 component can be constructed of a material the same as or different from the material of the foot actuator portion 36. Advantageously, the material of the frictional braking surface 48 can be selected to exhibit desirable frictional properties or wear properties, for example. Thus, the material of the frictional braking surface 48 can be optimized relative to the material used for the foot actuator portion 36, if desired. In the illustrated arrangement, the frictional braking surface 48 is directly affixed to the foot actuator portion 36; however, in other arrangements, the frictional braking surface 48 could be indirectly or otherwise affixed (e.g., through a linkage arrangement) to the foot actuator portion 36. The foot brake assembly 44 has a first position in which the frictional braking surface 48 is not in frictional contact with the braking wheel 43, and a second position in which the frictional braking surface 48 is in frictional contact with the braking wheel 43. In a preferred embodiment, the foot brake assembly is biased toward the first position by a biasing member 46. In an alternative embodiment, the foot brake assembly is biased toward the second position in which the frictional braking surface 48 contacts the braking wheel 43. In a preferred embodiment, the biasing member is a helical torsion spring, or other member with elastic properties sufficient to bias the foot brake assembly to the first position.

Figure 5:
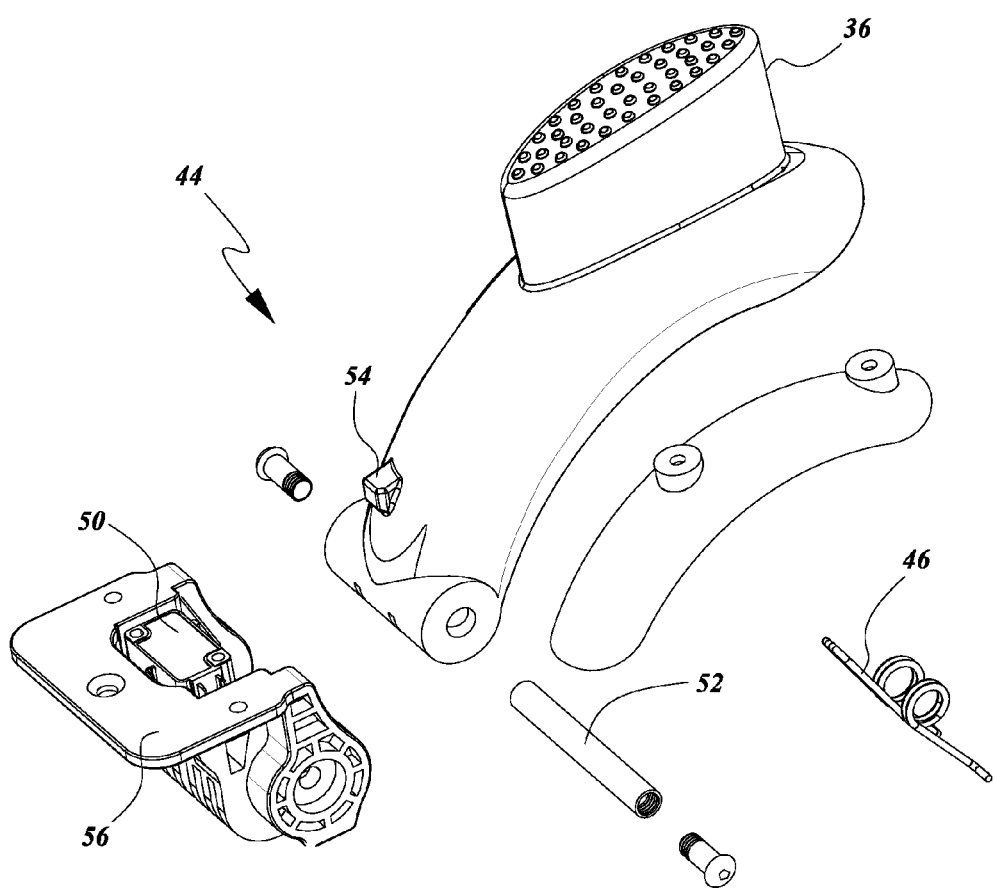
FIG. 5 is a close up view of the exploded view of FIG. 4.

FIG. 5 shows a close up view of the foot brake assembly 44 illustrated in FIG. 4. In a preferred embodiment, the foot brake assembly 44 comprises a brake power switch 50, a switch mounting unit 56, fender axle 52, a fender biasing member 46, and a foot actuator portion 36 which includes a switch release portion or member 54. In a preferred embodiment, the brake power switch 50 is positioned such that the switch release member 54 of the foot actuator portion 36 contacts and actuates or engages a portion of the brake power switch 54 in a first engaged or actuated position when the foot actuator portion 36 is in its first biased position wherein the foot brake assembly 44 does not make frictional contact with the braking wheel 43. When the user exerts a downward force on the foot actuator portion 36 to engage the frictional braking surface to the braking wheel 43, the switch release member 54 of the foot actuator portion is moved directionally away from the brake power switch 50 such that a portion of the brake power switch 50 changes to a second disengaged position in which the brake power switch 50 is disengaged or not actuated when the frictional braking surface 48 is placed in frictional braking contact with the braking wheel 43.

Alternatively, in other embodiments the switch release member 54 could be a coupled to the brake power switch 50 and configured to pull a portion of the switch 50 to disengage the switch 50 when the brake assembly is in second position with frictional contact with the braking wheel 43. In yet another embodiment, the brake power switch 50 is in an engaged state when it is not in contact with the release member 54, and the switch release member 54 is configured to contact a portion of the switch 50 in order to disengage the switch 50 when the brake assembly is in frictional contact with the braking wheel 43. In yet other embodiments, the brake power switch 50 can be supported by the foot actuator portion 36 and the release member 54 can be supported by the body 20 or another portion of the scooter.

As illustrated, when the brake power switch 50, or a portion thereof, is moved to the second disengaged position the brake power switch 50 initiates an electrical signal to the controller to isolate the electric motor from the driven wheel to terminate power transfer from the motor to the driven wheel. In another preferred embodiment, when the brake power switch 50 is moved to the second disengaged position, the disengagement causes a disruption in the electrical circuit comprising the controller, battery, motor, and driven wheel such that power transfer from the motor to the driven wheel is terminated. The disruption can occur anywhere in the electrical circuit of the vehicle that produces the desired result of terminating power transfer to the driven wheel, such as between the user throttle control and another part of the electrical circuit (e.g., the motor). Accordingly, the terms "engaged" and "disengaged" used herein with respect to the brake power switch 50 are used in the context of the interaction between the switch release member 54 and the switch 50, and do not necessarily reflect a physical position of a switch (e.g., open or closed) within an electrical circuit. Rather, any suitable arrangement can be employed in which a change in position or condition of the switch 50 results in a desired condition of the control circuit to transmit or interrupt electrical power to the driven wheel, as described above. The term "actuate" can include at least the engagement of a switch and disengagement of a switch. Moreover, the term "switch" is used in a broad sense and is intended to cover various devices. Such devices would include those that selectively open or close an electrical circuit or otherwise permit generation of a control signal. Thus, in some embodiments, the switch 50 can be in the form of any suitable position sensor to create a control signal that depends on whether the foot actuator portion 36 is in a first position or a second position. In a preferred embodiment, the brake power switch 50, switch release member 54, the fender axle 52, the fender biasing member 46, and the switch mounting unit 56 are all positioned underneath the scooter body 20 and support assembly 34 such that these components are protected from external debris, moisture, or harmful contact with external elements and inaccessible by inadvertent and accidental contact by the foot of the user. Moreover, in the illustrated arrangement, the release member 54 is positioned between the outer ends of the fender axle 52 in a lateral direction of the scooter. Preferably, the release member 54 is substantially aligned with a center point of the fender axle 52 and/or a central axis of the scooter. Such an arrangement allows for a compact, robust construction, with a minimum number of parts and, as discussed, provides protection from damage and the elements.

Figure 6:
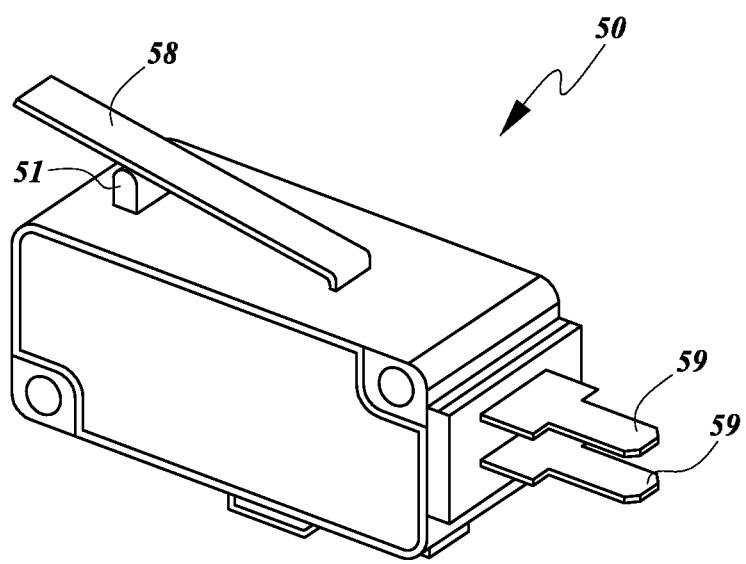
FIG. 6 is a perspective view of a power cut off switch of the scooter of FIG. 1.

FIG. 6 shows a close up view of the brake power switch 50 as illustrated in FIG. 5. In a preferred embodiment, the brake power switch 50 comprises a switch arm 58 providing a means for actuating (e.g., engaging and disengaging) the electrical switch 51. In a preferred embodiment, the switch arm 58 is biased toward a first position in which the electrical switch 51 is disengaged, and the switch arm 58 is movable to a second position in which the electrical switch 51 is engaged. The switch arm 58 may be biased by a biasing member such as a spring or other elastic material member, or switch arm 58 may biased due to the material composition of the switch arm such as a durable but flexible metal or plastic. The brake power switch 50 further comprises electrical leads 59 which are electrically coupled to wires leading to the controller to isolate the electric motor from the driven wheel to terminate power transfer from the motor to the driven wheel when the switch arm 58 is moved to the first position.

Figure 7:
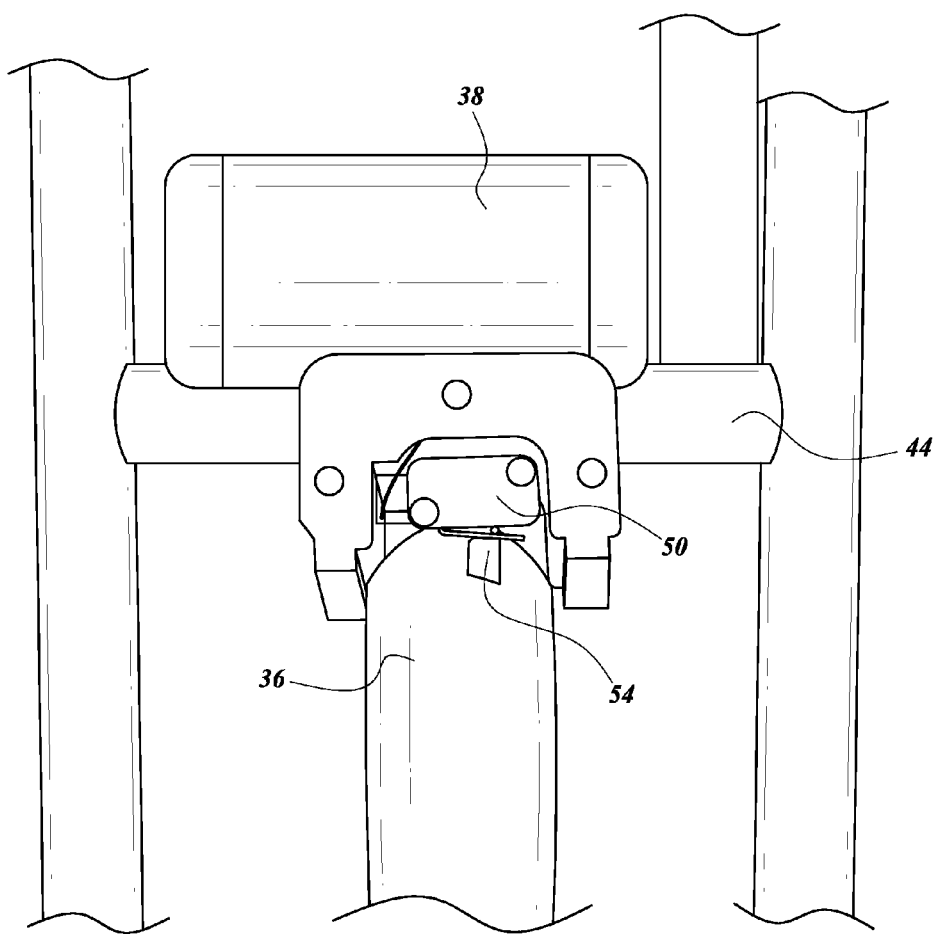
FIG. 7 is a top view of the foot brake assembly of the scooter of FIG. 1.

FIG. 7 depicts a top down view of the foot brake assembly 44 and brake power switch 50. In this view, the foot actuator portion 36 is depicted in its first position in which the frictional braking surface is not in frictional contact with the braking wheel, and the switch release member 54 of the foot actuator portion 36 can be seen contacting and engaging the switch arm of the brake power switch 50 to allow power transfer from the motor 38 to the driven wheel.

Figure 8:
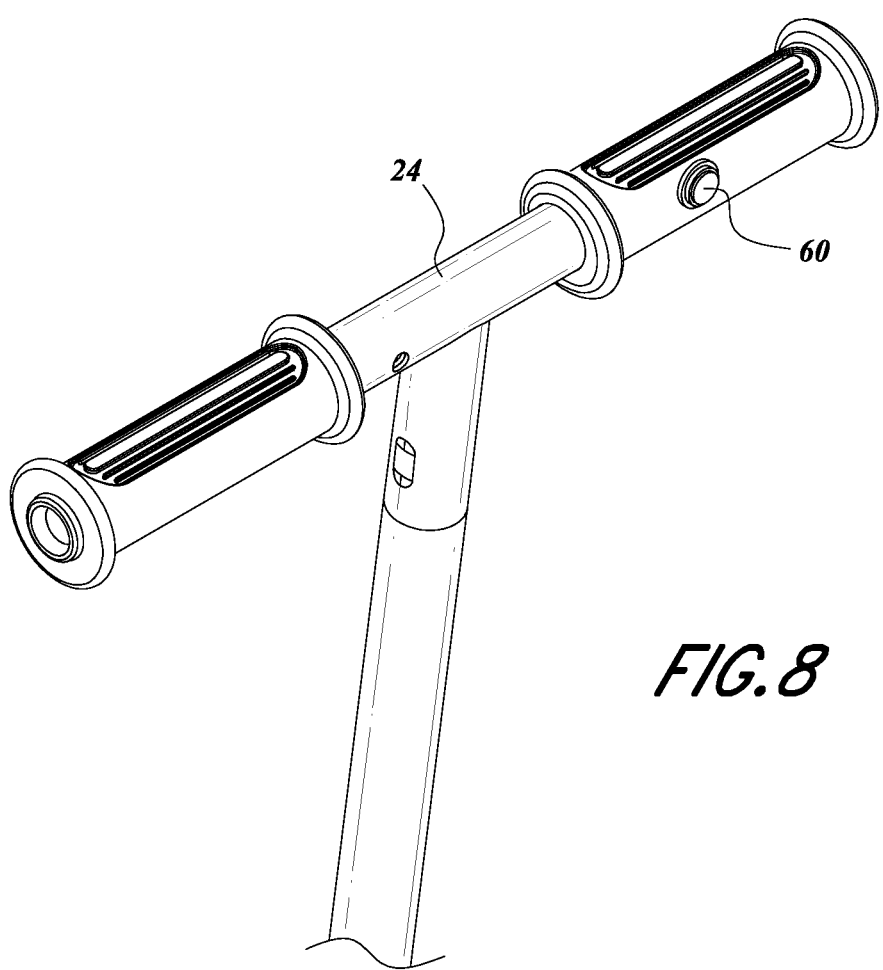
FIG. 8 is a perspective view of the handlebar assembly of the scooter of FIG. 1.

FIG. 8 is an illustration of an embodiment of a handlebar assembly 24 of the scooter. The handlebar assembly 24 comprises a button throttle 60 available to the hand of the user while the user operates the scooter 10. Depressing the button throttle 60 initiates an electric signal to the controller causing power transfer from the battery to the electric motor, resulting in rotational power being transferred from the electric motor to the at least one driven wheel. In an alternate preferred embodiment, the user is able to engage the throttle by a hand crank throttle mechanism mounted on the handlebar assembly. In another preferred embodiment, the user is able to engage the throttle by a hand lever mechanism, or other similar hand actuated mechanisms well known in the art. The electric signal generated by the throttle to the controller to cause power transfer from the battery to the electric motor is overridden by the electric isolation of the electric motor caused by the user acting upon the foot brake assembly to disengage the brake power switch.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present systems and methods have been described in the context of particularly preferred embodiments, the skilled artisan will appreciate, in view of the present disclosure, that certain advantages, features and aspects of the systems and methods may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the invention herein disclosed should not be limited by the particular embodiments described above, but should be determined only by a fair reading of the claims that follow.

What is claimed is:

1. A personal mobility vehicle comprising:
a body having a deck and an opening extending through the deck, the deck being configured to support a user, the deck defining a first height;
at least one wheel connected with the body and rotatable around an axis;
a braking assembly supported by the body; the braking assembly comprising:
an actuator portion that extends through the opening, the actuator portion having a second height accessible to the foot of a user through the opening;
a braking surface connected with the actuator portion and configured to apply frictional braking force when in contact with the at least one wheel;
a motor connected with the body and arranged to transfer rotational force to the at least one wheel;
a switch connected with the body and positioned below the deck;
wherein the braking assembly has an engaged position in which the braking surface is in contact with the at least one wheel;

wherein the braking assembly has a second position in which the braking surface does not contact the at least one wheel, the braking assembly being movable to the engaged position in response to the user acting upon the actuator portion, wherein the second height is greater than the first height such that the second height remains greater than the first height after moving the braking assembly to the engaged position and a top surface of the actuator portion does not move below the first height;

wherein the switch is configured to be actuated when the braking assembly is moved from the second position to the engaged position, and actuating the switch stops or impedes the transfer of force from the motor to the at least one wheel.

2. The personal mobility vehicle of claim 1, wherein the braking assembly is configured to be rotatably supported by the body.

3. The personal mobility vehicle of claim 1, wherein the braking assembly is biased away from the engaged position.

4. The personal mobility vehicle of claim 1, wherein the braking surface is configured to apply a frictional braking force upon the outer circumference of the at least one wheel.

5. The personal mobility vehicle of claim 1, wherein the actuator portion is proximate the foot of the user and the deck and the actuator portion are generally oval in shape from a top view with a major axis of the oval extending in a lengthwise direction of the deck.

6. The personal mobility vehicle of claim 1, wherein the deck defines a surface on which the user can stand and covers at least a portion of the at least one wheel, and the actuator portion extends above the deck.

7. The personal mobility vehicle of claim 1, wherein the braking surface is part of a braking member which is a separate piece supported by the braking assembly.

8. The personal mobility vehicle of claim 1 further comprising a handlebar assembly available to the user, the handlebar assembly comprising a throttle configured to allow power transfer from the motor to the at least one wheel.

9. The personal mobility vehicle of claim 8, wherein the throttle is isolated from the motor when the braking assembly is moved to the engaged position.

10. The personal mobility vehicle of claim 1, wherein the switch is positioned underneath the deck of the personal mobility vehicle.

11. The personal mobility vehicle of claim 10, wherein the switch is positioned forward of the axis of the at least one wheel.

12. A braking assembly for a personal mobility vehicle, the personal mobility vehicle having a support member, a wheel, at least one battery and a motor configured to transfer power to the wheel, the braking assembly comprising:
a body comprising:
an attachment portion configured to be connected with the personal mobility vehicle;
an actuator portion that is accessible to a foot of a user, the actuator portion including a switch release member;
a braking member connected with the body and configured to apply frictional braking force when in contact with the wheel;
a switch configured to be connected with the body and underneath a portion of the personal mobility vehicle;
wherein the body is movable to an engaged position in which the braking member is in contact with a wheel in response to the user acting upon the actuator portion;
wherein, in response to the user acting upon the actuator portion, the switch release member engages at least a portion of the switch when the body is in a disengaged position and the switch release member pulls a portion of the switch to disengage the switch when the body is moved to the engaged position.

13. The braking assembly of claim 12, wherein the body is biased away from the engaged position.

14. The braking assembly of claim 12, wherein the braking member is configured to apply a frictional braking force upon an outer circumference of the wheel.

15. The braking assembly of claim 12, wherein the actuator portion extends through a portion of the personal mobility vehicle.

16. The braking assembly of claim 12, further comprising a switch contact portion configured to interact with the switch, the switch being configured to change status when the switch contact portion is moved relative to the switch.

17. A personal mobility vehicle configured to roll over a surface, the vehicle comprising:
a body having a deck configured to support a user, a rear portion of the deck being at a first height above the surface, the body further comprising an opening extending through the deck;
at least one wheel connected with the body and rotatable around an axis, the wheel configured to roll on the surface;
a braking assembly connected with the body, the braking assembly comprising an actuator portion that extends through the opening, the actuator portion having a second height above the surface, a top portion of the actuator portion being accessible to the foot of a user;
the braking assembly being movable to an engaged position in response to a generally downward force being applied to the actuator portion, the braking assembly being configured such that in the engaged position:
the braking assembly applies frictional braking force to the at least one wheel; and
the second height is greater than the first height.

18. The personal mobility vehicle of claim 17, wherein, in the engaged position, the top surface of the actuator portion is higher than the first height.

* * * * *